(12) United States Patent
Pepper et al.

(10) Patent No.: US 9,491,081 B2
(45) Date of Patent: Nov. 8, 2016

(54) METHODS, SYSTEMS, AND COMPUTER READABLE MEDIA FOR GENERATING TEST PACKETS IN A NETWORK TEST DEVICE USING VALUE LIST CACHING

(75) Inventors: Gerald R. Pepper, Newbury Park, CA (US); Matthew R. Bergeron, Thousand Oaks, CA (US); Johnny Tsung Lin Ho, Alhambra, CA (US)

(73) Assignee: Ixia, Calabasas, CA (US)

( * ) Notice: Subject to any disclaimer, the term of this patent is extended or adjusted under 35 U.S.C. 154(b) by 0 days.

(21) Appl. No.: 13/478,083

(22) Filed: May 22, 2012

(65) Prior Publication Data

US 2013/0318291 A1    Nov. 28, 2013

(51) Int. Cl.
*G06F 12/00* (2006.01)
*H04L 12/26* (2006.01)
*H04L 12/24* (2006.01)

(52) U.S. Cl.
CPC .............. *H04L 43/10* (2013.01); *H04L 43/50* (2013.01); *H04L 41/5038* (2013.01)

(58) Field of Classification Search
USPC .......................... 711/105, 154, 118; 345/557
See application file for complete search history.

(56) References Cited

U.S. PATENT DOCUMENTS

| | | | | |
|---|---|---|---|---|
| 6,437,789 B1* | 8/2002 | Tidwell et al. | ............... | 345/557 |
| 6,892,285 B1* | 5/2005 | Key et al. | ...................... | 711/154 |
| 7,428,239 B1* | 9/2008 | Seigneurbieux | .... | H04L 12/5693 |
| | | | | 370/418 |
| 7,616,568 B2* | 11/2009 | Olderdissen et al. | ........ | 370/231 |
| 8,456,999 B2* | 6/2013 | Hatley | .......................... | 370/241 |

OTHER PUBLICATIONS

Iyer et al., "Designing Packet Buffers for Router Linecards" Networking,IEEE/ACM Transactions, vol. 16, Issue 3, pp. 705-717, Jun. 13, 2008.*

* cited by examiner

*Primary Examiner* — Brian Peugh
*Assistant Examiner* — Tracy Chan
(74) *Attorney, Agent, or Firm* — Jenkins, Wilson, Taylor & Hunt, P.A.

(57) ABSTRACT

Methods, systems, and computer readable media for generating test packets in a network device using value lists caching are disclosed. In one method, value lists are stored in dynamic random access memory of a network test device. Each value lists includes values for user defined fields (UDFs) to be inserted in test packets. Portions of each value lists are read into per-port caches. The UDF values are drained from the per-port caches using per-port stream engines to generate and send streams of test packets to one or more devices under test. The per-port caches are refilled with portions of the value lists from the DRAM and a rate sufficient to maintain the sending of the stream engine packets to the one or more devices under test.

19 Claims, 6 Drawing Sheets

METHODS, SYSTEMS, AND COMPUTER READABLE MEDIA FOR GENERATING TEST PACKETS IN A NETWORK TEST DEVICE USING VALUE LIST CACHING

TECHNICAL FIELD

The subject matter described herein relates to generating tests packets for testing communications and storage network components. More particularly, the subject matter described herein relates to methods, systems, and computer readable media for generating tests packets in a network test device using value list caching.

BACKGROUND

In communications or storage networks, it is desirable to test network components. One method for testing network components involves using a network test device to send simulated data packets to the communications or storage network element under test and monitor the response of the device to the tests packets. In order to simulate real-world events, it is necessary to change parameter values in the test packets. For example, packet headers often carry sequence numbers, and to accurately simulate some network protocols, it is necessary to change the sequence numbers in successive packets in a stream of packets transmitted to the device under test. Other values that it may be desirable to change in successive packets include source and destination addresses, quality of service parameters, and packet payloads.

The values that are defined by a user or a test application and inserted in a packet are referred to herein as user defined field (UDF) values. A list of user defined fields for a stream of packets relating to an endpoint is referred to herein as a value list. A group of packets related to the same transaction or endpoint is referred to as a flow. For example, in a telecommunications network, a flow of packets may represent packets transmitted from a network access node, such as an eNode B, to another node, such as serving gateway. A group of flows is referred to herein as a stream.

Generating test packets involves reading value lists from memory to construct each packet. The number of memory accesses increases with the number of packets and the number of streams being generated. As a result, memory access bandwidth can become a bottleneck.

One possible solution to the memory access bandwidth problem is to use high bandwidth static random access memory (SRAM) to store the value lists. However, SRAMs are expensive. To reduce memory costs, it may be desirable to use dynamic random access memory (DRAMs) to store the value lists. However, the DRAMs are slow when compared to SRAMs, particularly when it comes to random access.

Accordingly, in light of these difficulties, there exists a need for methods, systems, and computer readable media for generating test packets and network in a network test device using value list caching.

SUMMARY

Methods, systems, and computer readable media for generating test packets in a network device using value list caching are disclosed. In one method, value list are stored in dynamic random access memory of a network test device. Each value list includes values for user defined fields (UDFs) to be inserted in test packets. Portions of each value list are read into per-port caches. The UDF values are drained from the per-port caches using per-port stream engines to generate and send streams of test packets to one or more devices under test. The per-port caches are refilled with portions of the value lists from the DRAM and a rate sufficient to maintain the sending of the packets to the one or more devices under test.

The subject matter described herein can be implemented using a non-transitory computer readable medium having stored thereon executable instructions that when executed by the processor or the computer control the computer to perform steps. Exemplary computer readable media suitable for implementing the subject matter described herein include chip memory devices, disk memory devices, programmable logic devices and application specific integrated circuits. In addition, a computer readable medium that implements the subject matter described herein may be located on a single device or computing platform or may be distributed across plural devices or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
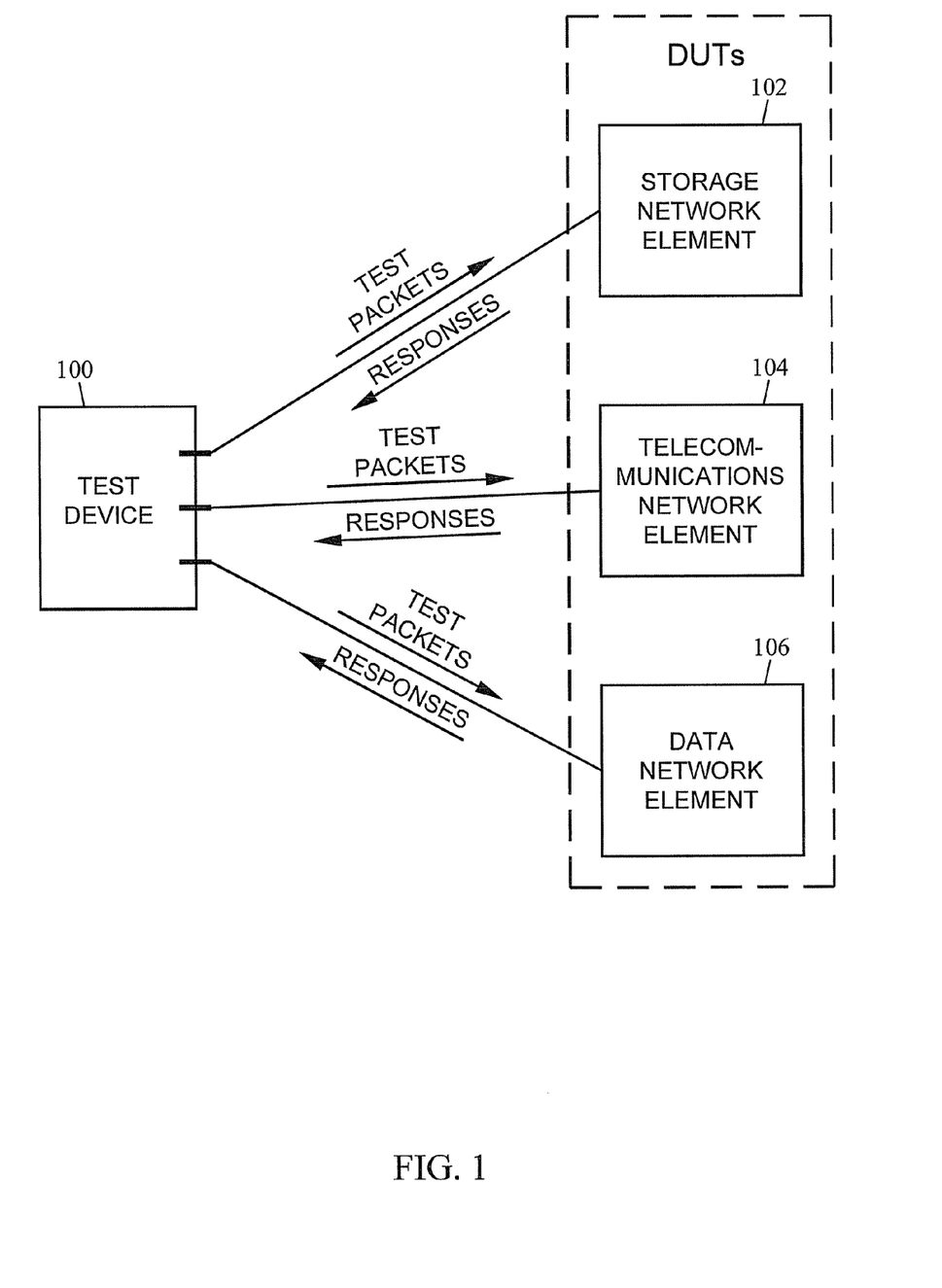
FIG. 1 is a network diagram illustrating a test device sending test packets to one or more devices under test.

FIG. 1 is a block diagram illustrating an exemplary environment in which the methods, systems, and computer readable media described herein for generating test data packets in a network test device using value list caching may be used. Referring to FIG. 1, test device 100 uses value list caching to generate test packets and send the test packets to devices under test 102, 104, and 106. Test device 100 may be a network emulator that emulates the functions of a network or network element. Test device 100 may also be or include a network analyzer that receives responses from devices under test 102, 104, and 106 and generates performance metrics based on the responses. In the illustrated example, the devices under test include storage network element 102, which may be a storage array processor or other front end for one or more storage elements, such as one or more disk arrays. Device under test 104 is a telecommunications network element that may be a 3G, 4G, or subsequent generation telecommunications platform. For example, in 4G or long term evolution (LTE) networks, telecommunications network element 104 may be an LTE network element, such as a mobility management entity (MME) or a serving gateway (SGW). Data network element 106 may be any element in the data network that receives packets. For example, data network element 106 may be a server, a firewall, a network address translator, a switch, or a router.

Figure 2:
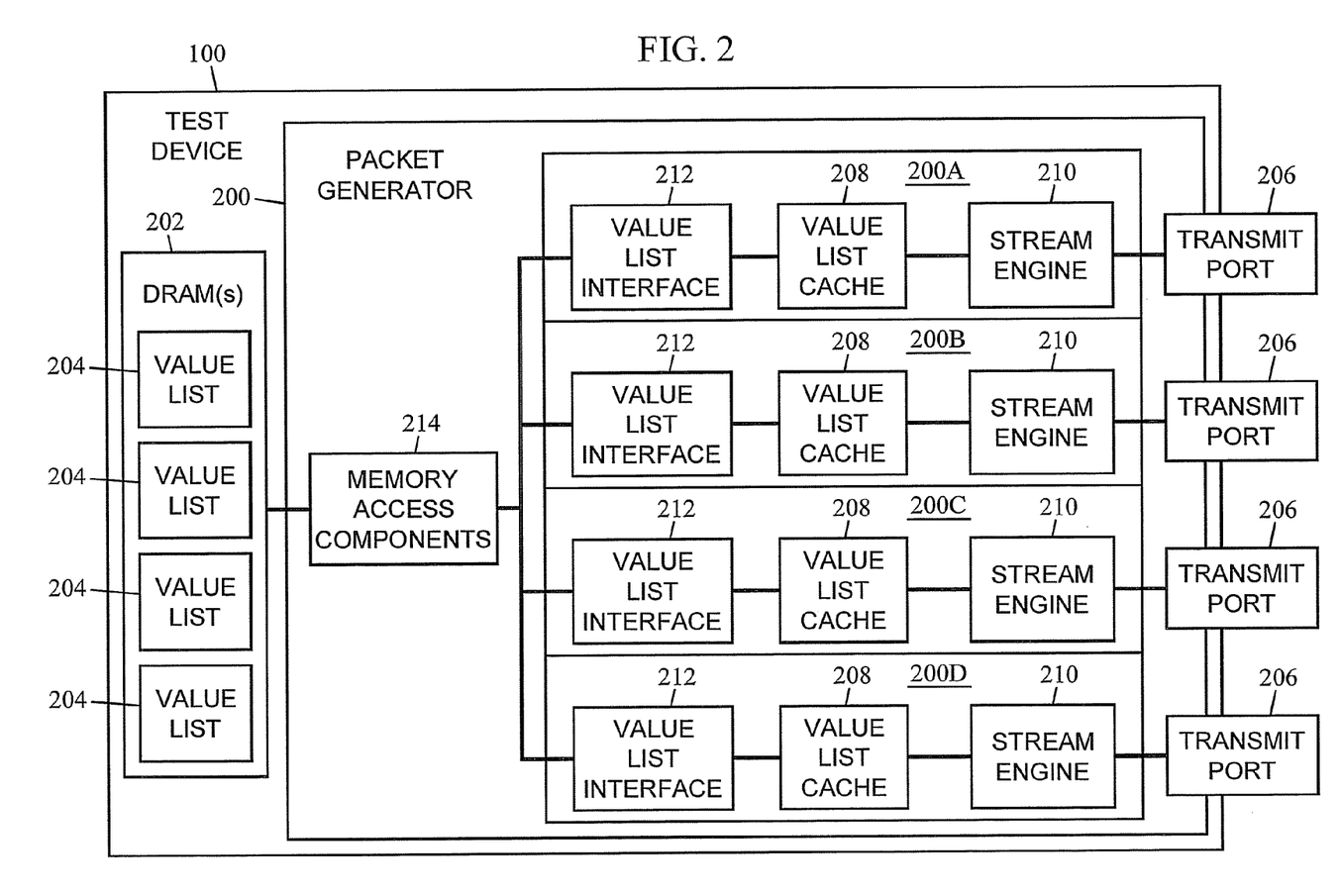
FIG. 2 is a block diagram illustrating exemplary components of a test device according to an embodiment of the subject matter described herein.

In the architecture illustrated in FIG. 1, it is desirable that test device 100 include an architecture that efficiently generates test packets. It may be desirable for test device 100 to use DRAM memory for storing value lists used for generating test packets but to include an architecture that overcomes the bandwidth limitations of DRAM. FIG. 2 is a block diagram of test device 100 illustrating such architecture. Referring to FIG. 2, test device 100 includes a packet generator 200 divided into per-port sections 200A, 200B, 200C, and 200D for generating and caching packets using value lists stored in one or more DRAMs 202. In the illustrated example, DRAM 202 includes per-port value lists 204 corresponding to each of a plurality of transmit ports 206. Packet generator 200 includes per-port value list caches 208 that cache portions of value lists 204 to be used in formulating packets to be transmitted to a device under test. Per-port stream engines 210 empty caches 208 and transmit packets to devices under test. Value list interfaces 212 refill value list caches 208 by accessing the value lists stored in DRAMs 202 via memory access components 214. It is desirable that caches 208 are not starved. Accordingly, a cache refill algorithm that reduces the likelihood of starvation is desirable. An example of such an algorithm will be described in detail below.

Figure 3:
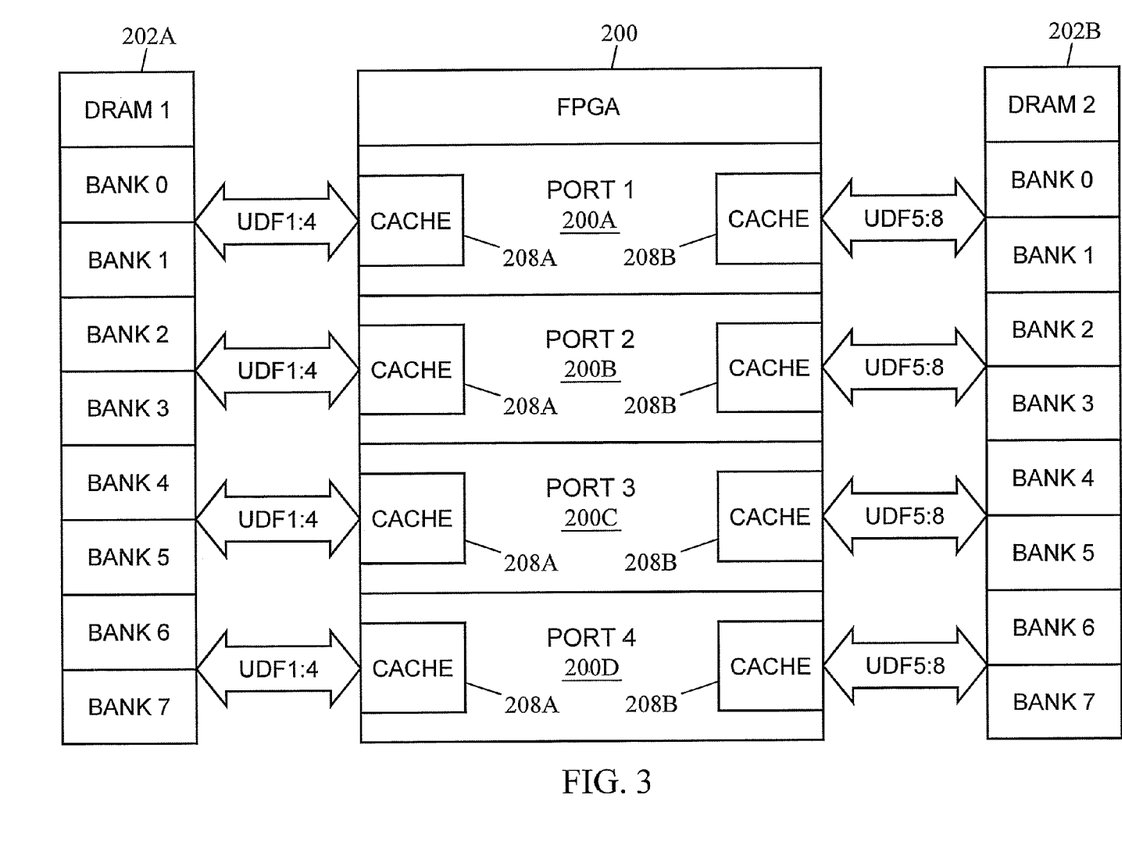
FIG. 3 is a block diagram illustrating memory organization of a test device according to an embodiment of the subject matter described herein.

FIG. 3 is a block diagram illustrating exemplary memory architecture of network device 100 in more detail. In FIG. 3, packet generator 200 includes two caches 208A and 208B for each transmit port. Two DRAMs 202A and 202B are provided, with each DRAM including eight banks, where two banks are assigned to each port. For example, the value list for port 1 is stored in banks 0 and 1 of DRAM 202A and 202B. The value list for port 2 is stored in banks 2 and 3 of DRAMs 202A and 202B and so forth. As stated above, each value list is broken into user defined fields. In the current memory architecture, each DRAM is only capable of responding to four UDF requests at line speed. Using two DRAMs, eight UDFs for each value list can be requested during a given memory access cycle.

According to one aspect of the subject matter described herein, access to DRAM 202A and 202B is time sliced across the ports of packet generator 200. That is, each port 1 through 4 is given an equal time window to obtain UDFs from each DRAM 202A and 202B, where the time window repeats at regular intervals. Such deterministic behavior ensures that the bandwidth usage of a given port does not change the bandwidth available to another port.

According to another aspect described herein, each cache 208A and 208B is scheduled for refilling prior to the cache being drained. The attempted refilling prior to draining is referred to as pre-fetching. In one example, each cache is scheduled for refilling when a fixed number of UDFs that is less than all of the UDFs has been drained from the cache. In the present architecture, the fixed number is four UDF entries for a cache size of 16 UDF entries. Thus, when a given cache is depleted to 12 entries, a refill request is generated.

Figure 4:
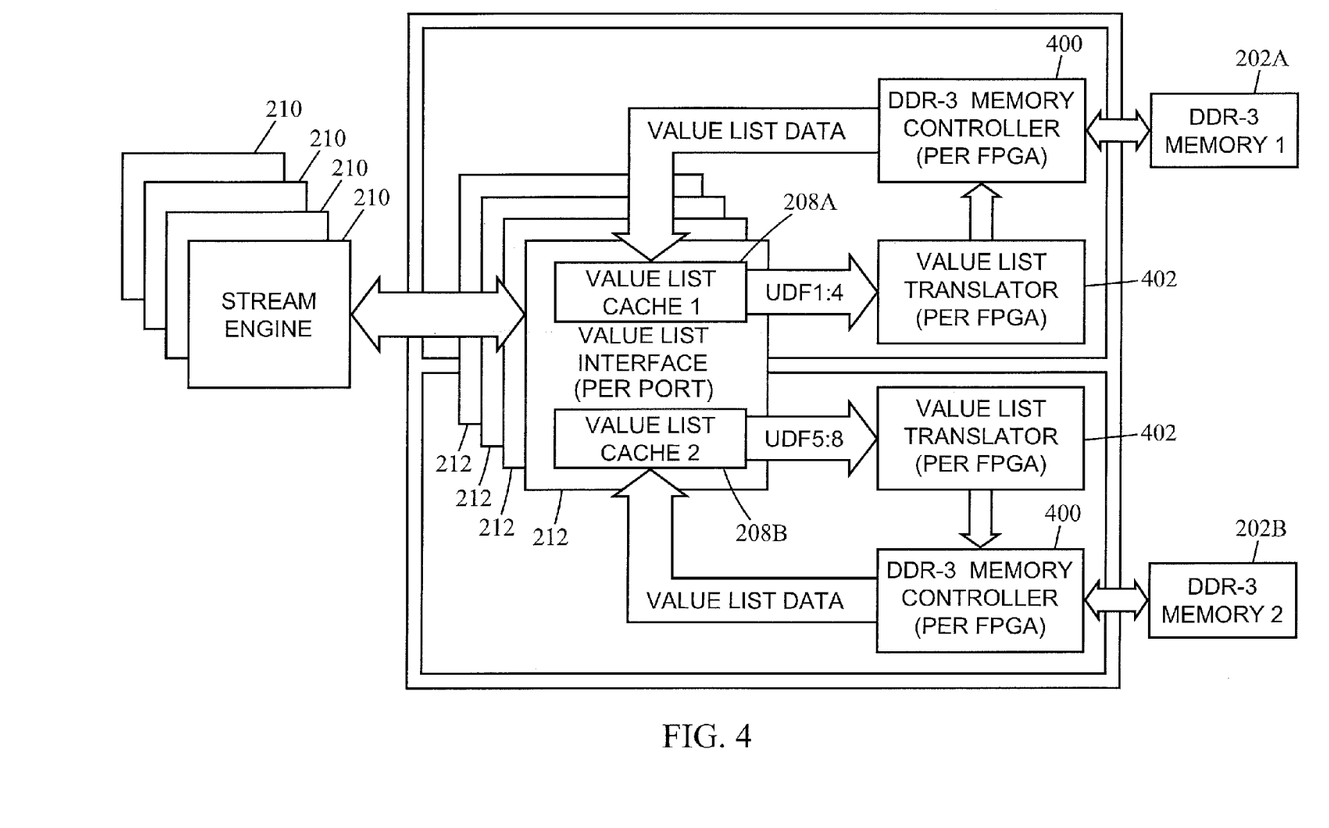
FIG. 4 is a block diagram illustrating exemplary components of a test device in more detail according to an embodiment of the subject matter described herein.
Figure 5:
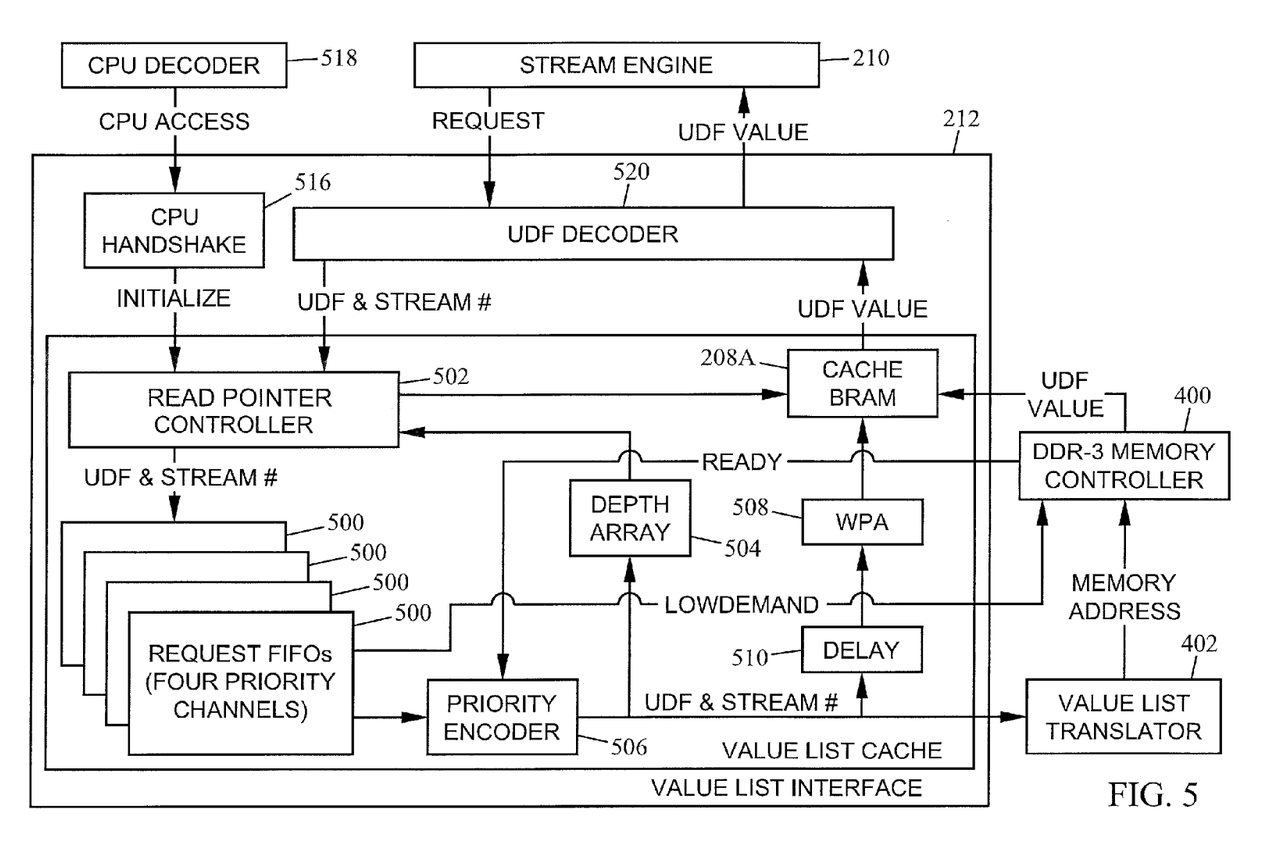
FIG. 5 is a block diagram illustrating exemplary components of the value list interface of the test device according to an embodiment of the subject matter described herein.

As stated above, the value list interface 212 is the component responsible for the refilling the caches. FIGS. 4 and 5 illustrate and exemplary architecture for draining and refilling caches according to an embodiment of the subject described herein. Referring to FIG. 4, each value list interface 212 maintains caches 208A and 208B for each per-port stream engine 210, which depletes the caches. Value list interfaces 212 request new value lists from memory 202A and 202B via DRAM memory controllers 400 and value list translator 402. DRAM memory controller 400 implements the electrical interface and commands for accessing DRAMs 202A and 202B. Value list translators 402 translate stream and UDF numbers into an address format suitable for obtaining the data from memories 202A and 202B.

At the start of each transmit session, a value list interface 212 initializes its two caches 208A and 208B with value list entries from DRAMs 202A and 202B. Transmission of packets from stream engines 210 preferably does not start until both caches are fully initialized. When a transmit request arrives from a stream engine 210, the corresponding value list interface 212 indexes its internal cache 208A or 208B with the requested stream and UDF numbers to determine which cache entry to return to the stream engine 210.

Eventually, new entries will need to be fetched from DRAMs 202A or 202B. To fetch new entries, value list interface 212 forwards the stream and the UDF numbers to a value list translator 402. Value list translator 402 knows the exact address range (as initialized by a CPU) (not shown in FIG. 4) where the corresponding value list is stored. With such information, value list translator 402 translates the stream and UDF numbers into burst-aligned memory addresses and sends the addresses to memory controller 400. Memory controller 400 fetches value list entries from DRAMs 202A and 202B and returns them to the requesting value list interface 212.

As stated above, new entries from DRAM are preferably prefetched while there is still as sufficient number of valid entries in a given cache 208A or 208B for a given value list to avoid under flowing or holding off the transmission by a stream engine 210. Value list interface 212 is responsible for this refilling. FIG. 5 illustrates an exemplary architecture for value list interface 212 according to an embodiment of the subject matter described herein. Referring to FIG. 5, value list interface 212 allows prioritization of cache refill requests based on the relative amount of empty space in a given cache. To implement such a mechanism, value list interface 212 includes request FIFOs 500, each implementing a priority level for cache refill requests. As stated above, when four UDFs are removed from a given cache, a refill request is made to obtain new UDF data from DRAM. In one example, each cache includes sixteen column entries, where each column entry stores a four byte UDF value. One of request FIFOs 500 queues requests corresponding to caches that have twelve remaining entries. Another of request FIFOs 500 is for caches that have eight remaining entries. Another of request FIFOs 500 is for caches that have four remaining entries and another of request FIFOs 500 is for queues that have no remaining entries. Thus, when the depth of a cache transitions from one priority level to another, its refill request is moved to the next highest level queue. Using such a priority mechanism, the cache that is most likely to run out first is refilled first. Also, the likelihood of starvation of one cache caused by a request from a lower priority cache is reduced.

Pre-fetching of data from DRAMs will now be described in more detail. After initialization, cache 208A stores the first sixteen value list entries for each stream and UDF pair. To update the entries in cache 208A with new entries, read pointer controller 502 sends a request to fetch new entries from DRAM when the number of entries in a given cache crosses a modulo four number. A depth array 504 keeps track of the depth of each cache. This condition is chosen because a four entry boundary matches the burst size of the memories currently being used, where full entries correspond to 16 bytes. As stated above, request FIFOs 500 store memory access requests of different priorities. A priority encoder 506 only services the request FIFO with the highest priority that is not empty. Priority is used to prevent cases where pre-fetched requests of slow streams are pre-fetched requests of a faster demanding stream. As stated above, priority is determined by the depth of a given cache, where the cache with the smallest number of entries remaining is placed in the highest priority queue. A write pointer array (WPA) 508 determines which entries to write to a given cache when value lists entries are returned from DRAM. As stated above, data from the DRAM comes in a burst of 4 byte entries. The entries are split across two cycles of 8 bytes. The WPA's value is incremented once every burst return and location is determined by stream UDF pair. Since the memory controller is designed to have a fixed read latency, the index to WPA 508 can be a delayed version of the output from priority encoder 506, with the delay being implemented by a delay block 510.

Another aspect of the subject matter described herein is to identify repeating UDF values in a given stream and to leave those values in a given cache until the last of such repeating values is needed. For example, if it is desirable to generate a sequence of packets with the same source IP address, and the source IP address is stored in a given cache, it is desirable to maintain that value in the cache and repeatedly re-read the value from the cache without popping the value from the cache. This functionality may be implemented by read pointer controller 502. Read pointer controller 502 is a state machine that accepts initialization requests from CPU handshake block 516 received from a CPU (now shown) via CPU decoder 518. Initialization involves initially filling the caches for each port. Once initialized, read pointer controller 502 can receive UDF requests from stream engines 210 via UDF decoder 520. Each request includes a stream number, a UDF number, a pop attribute, a peek attribute, and a read last attribute. Stream and UDF numbers are used to determine which row and column to index in cache 208A. The pop attribute is used to determine whether or not to remove the corresponding entry from cache 208A. If the pop attribute is set, the cache entry is removed. If the pop attribute is not set, the cache value is not removed and is only read. For a repeating value that is to be inserted in successive packets, the peek attribute is used. If the peek attribute is asserted, a read pointer array, which points to the current column being read from a cache, will remain unchanged. This ensures that the value will be re-read the next time. The read last attribute is only valid when pop is asserted and is used to round the RPA address entry up to a modulo-4 number.

In order to assess the theoretical performance of the value list caching scheme described herein, a table illustrating the access scheme for a given DRAM was generated. Table 1 shown below illustrates a theoretical read memory access scheme used to evaluate the performance of the memory access scheme described herein.

TABLE 1

Read Memory Access Scheme

| | Bank 0/1 | Bank 2/3 | Bank 4/5 | Bank 6/7 | Bank 0/1 | Bank 2/3 | Bank 4/5 | Bank 6/7 |
|---|---|---|---|---|---|---|---|---|
| 1 | Act | | | | | | | |
| 2 | | | | | | | | |
| 3 | | | | | | | | |
| 4 | | | | | | | | |
| 5 | | Act | | | | | | |
| 6 | | | | | | | | |
| 7 | | | | | | | | |
| 8 | Rd | | | | | | | |
| 9 | | | Act | | | | | |
| 10 | | | | | | | | |
| 11 | | | | | | | | |
| 12 | | Rd | | | | | | |
| 13 | | | | Act | | | | |
| 14 | DQ | | | | | | | |
| 15 | DQ | | | | | | | |
| 16 | DQ | | Rd | | | | | |
| 17 | DQ | | | | | | | |
| 18 | | DQ | | | | | | |
| 19 | | DQ | | | | | | |
| 20 | | DQ | | Rd | | | | |
| 21 | | DQ | | | | | | |
| 22 | | | DQ | | Wait for tFAW | | | |
| 23 | | | DQ | | Act | | | |
| 24 | | | DQ | | | | | |
| 25 | | | DQ | | | | | |
| 26 | | | | DQ | | | | |
| 27 | | | | DQ | | Act | | |
| 28 | | | | DQ | | | | |
| 29 | | | | DQ | | | | |
| 30 | | | | | Rd | | | |
| 31 | | | | | | | Act | |
| 32 | | | | | | | | |
| 33 | | | | | | | | |
| 34 | | | | | | Rd | | |
| 35 | | | | | | | | Act |
| 36 | | | | | DQ | | | |
| 37 | | | | | DQ | | | |
| 38 | | | | | DQ | | Rd | |
| 39 | | | | | DQ | | | |
| 40 | | | | | | DQ | | |
| 41 | | | | | | DQ | | |
| 42 | | | | | | DQ | | Rd |
| 43 | | | | | | DQ | | |
| 44 | | | | | | | DQ | |
| 45 | | | | | | | DQ | |
| 46 | | | | | | | DQ | |
| 47 | | | | | | | DQ | |
| 48 | | | | | | | | DQ |
| 49 | | | | | | | | DQ |
| 50 | | | | | | | | DQ |
| 51 | | | | | | | | DQ |

In Table 1, each column corresponds to an operation being performed on a given bank of memory. Each row represents a clock period. In the table "Act" represents an activate command for a given bank of memory, "Rd" represents that the corresponding bank is ready, "DQ" represents data being accessed from the memory, and "tFAW" represents a limitation between successive accesses of a DRAM.

In the illustrated example, in the first 13 clock cycles, activate requests are implemented for the memory banks for the first four ports. Beginning at clock cycle 14 and proceeding continually through clock cycle 29, four bursts of data (burst length equals eight) are read for each port. To maximize memory bandwidth, it would be desirable to begin reading the next burst of four accesses for bank zero beginning at clock cycle 30. However, because of the memory parameter tFAW, the next data that can be read for port 1 begins at line 36. tFAW limits the number of activates that can be performed in a 22 clock cycle window. The effects of tFAW could be mitigated by either slowing down the clock or increasing the burst length. However, increasing the burst length increases cache size, which has its own set of disadvantages. Slowing the clock down reduces the effective memory bandwidth.

The following calculations illustrate the required memory bandwidth to transmit 64 byte Ethernet frames at a line rate of 10 gigabytes:

Memory Bandwidth Requirement

Minimum Memory Bandwidth Required is calculated below:

Minimum time period per-frame=67.2 ns (frame size @ 64 B)
Maximum # of UDFs per-DRAM per-frame=4 requests
Bytes per-UDF request=4 B $$\text{Memory Bandwidth Required} = (4\ \text{request} * 4B/\text{request})/67.2\ \text{ns}$$
$$= 228\ \text{MBps}$$
$$= 1.78\ \text{Gbps}$$

Actual memory bandwidth supported is calculated below:
Data Bytes per-Burst=16B
Time period per-Burst=55 ns
Effects of periodic refresh and ZQ calibration need to be accounted for in actual memory bandwidth.

Time to perform refresh=$T_{refresh}$=180 ns
Refresh Cycle Period=$T_{refcyc}$=64 ms/(8192+1)=7.8 us
Refresh factor=$1-T_{refresh}/T_{refcyc}$=97%

$$\text{Actual Memory Bandwidth} = 97\% * 16B/55\ \text{ns}$$
$$= 269\ \text{MBps}$$
$$= 2.10\ \text{Gbps}$$

From the calculations above, it can be seen that 67.2 nanoseconds is the time required to send the smallest legal Ethernet frame of 64 bytes at 10 gigabytes per-second. The actual time period per-burst is calculated at 55 nanoseconds. Since 55 nanoseconds is less than 67.2 nanoseconds, a 10 gigabyte per-second line rate can be achieved for each port.

Enhancements

The current memory access scheme is unable to support five UDFs mapped to one DRAM, which would require 2.22 Gbps memory bandwidth. To increase memory bandwidth, each bank access can be increased from one to two bursts as shown in Table 2. In this scheme, autoprecharge can no longer be enabled and manual precharge must be performed at the cycle stated. The effective bandwidth under this proposed scheme is calculated as 97%*32 B/(32*2.5 ns)=370 MBps=2.96 Gbps.

TABLE 2

Proposed Memory Access Scheme with Two Consecutive Bursts

| | Bank0/1 | Bank2/3 | Bank4/5 | Bank6/7 | Bank0/1 | Bank2/3 | Bank4/5 | Bank6/7 |
|---|---|---|---|---|---|---|---|---|
| 1 | Act | | | | | | | |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | Rd | | | | | | | |
| 9 | | Act | | | | | | |
| 10 | | | | | | | | |
| 11 | | | | | | | | |
| 12 | Rd | | | | | | | |
| 13 | | | | | | | | |
| 14 | DQ | | | | | | | |
| 15 | DQ | | | | | | | |
| 16 | DQ | Rd | | | | | | |
| 17 | DQ | | Act | | | | | |
| 18 | DQ/Prechrg. | | | | | | | |
| 19 | DQ | | | | | | | |
| 20 | DQ | Rd | | | | | | |
| 21 | DQ | | | | | | | |
| 22 | | DQ | | | | | | |
| 23 | | DQ | | | | | | |
| 24 | | DQ | Rd | | | | | |
| 25 | | DQ | | Act | | | | |
| 26 | | DQ/Prechrg. | | | | | | |
| 27 | | DQ | | | | | | |
| 28 | | DQ | Rd | | | | | |
| 29 | | DQ | | | | | | |
| 30 | | | DQ | | | | | |
| 31 | | | DQ | | | | | |
| 32 | | | DQ | Rd | | | | |
| 33 | | | DQ | | Act | | | |
| 34 | | | DQ/Prechrg. | | | | | |
| 35 | | | DQ | | | | | |
| 36 | | | DQ | Rd | | | | |
| 37 | | | DQ | | | | | |
| 38 | | | | DQ | | | | |
| 39 | | | | DQ | | | | |
| 40 | | | | DQ | Rd | | | |
| 41 | | | | DQ | | Act | | |

TABLE 2-continued

Proposed Memory Access Scheme with Two Consecutive Bursts

| | Bank0/1 | Bank2/3 | Bank4/5 | Bank6/7 | Bank0/1 | Bank2/3 | Bank4/5 | Bank6/7 |
|---|---|---|---|---|---|---|---|---|
| 42 | | | | DQ/Prechrg. | | | | |
| 43 | | | | DQ | | | | |
| 44 | | | | DQ | Rd | | | |
| 45 | | | | DQ | | | | |
| 46 | | | | | DQ | | | |
| 47 | | | | | DQ | | | |
| 48 | | | | | DQ | Rd | | |
| 49 | | | | | DQ | | Act | |
| 50 | | | | | DQ/Prechrg. | | | |
| 51 | | | | | DQ | | | |
| 52 | | | | | DQ | Rd | | |
| 53 | | | | | DQ | | | |
| 54 | | | | | | DQ | | |
| 55 | | | | | | DQ | | |
| 56 | | | | | | DQ | Rd | |
| 57 | | | | | | DQ | | Act |
| 58 | | | | | | DQ/Prechrg. | | |
| 59 | | | | | | DQ | | |
| 60 | | | | | | DQ | Rd | |
| 61 | | | | | | DQ | | |
| 62 | | | | | | | DQ | |
| 63 | | | | | | | DQ | |
| 64 | | | | | | | DQ | Rd |
| 65 | | | | | | | DQ | |
| 66 | | | | | | | DQ/Prechrg. | |
| 67 | | | | | | | DQ | |
| 68 | | | | | | | DQ | Rd |
| 69 | | | | | | | DQ | |
| 70 | | | | | | | | DQ |
| 71 | | | | | | | | DQ |
| 72 | | | | | | | | DQ |
| 73 | | | | | | | | DQ |
| 74 | | | | | | | | DQ/Prechrg. |
| 75 | | | | | | | | DQ |
| 76 | | | | | | | | DQ |
| 77 | | | | | | | | DQ |

Figure 6:
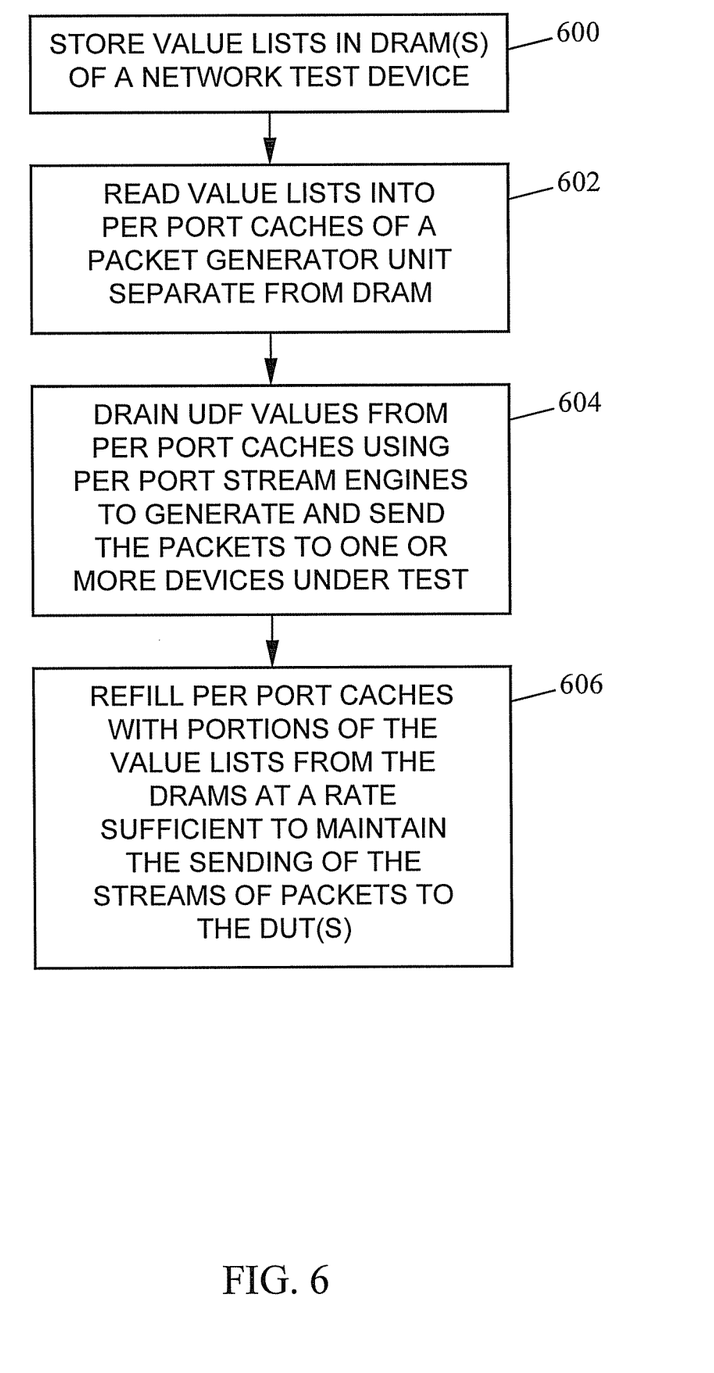
FIG. 6 is a flow chart illustrating exemplary steps for generating test packets in a network test device using value lists caching according to an embodiment of the subject matter described herein.

FIG. 6 is a flow chart illustrating exemplary overall steps for generating and sending test packets using cache value lists according to an embodiment of the subject matter described herein. Referring to FIG. 6, in step 600, value lists are stored in DRAMs of a network test device. Referring to FIG. 2, DRAMs 202 store per-port value lists. In step 602, value lists are read into per-port caches of a packet generator unit separate from a DRAM. In FIG. 2, packet generator unit 200 stores value lists in value list caches 208. In step 604, UDF values are drained from the per-port caches using per-port stream engines to generate and send packets to one or more devices under test. In FIG. 2, stream engines 210 transmit packets to devices under test via transmit ports 206. In step 606, per-port caches are refilled with portions of the value lists from the DRAMs at a rate sufficient to maintain the sending of streams of packets to the devices under test. For example, in FIG. 2, value list interfaces 212 pre-fetch UDFs from DRAMs 202 as the depth of each value list cache crosses predetermined thresholds.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:
1. A method for generating test packets for testing a communications or storage network element using value list caching, the method comprising:
  in a network test device configured to generate and send test data packets to one or more devices under test:
    storing the plurality of value lists in dynamic random access memory (DRAM), each value list including values for user defined fields (UDFs) to be inserted in the test data packets;
    reading each of the value lists from the DRAM into per-transmit port caches separate from the DRAM;
    providing a read pointer controller that receives UDF requests from per-port stream engines, each request including a peek attribute that if asserted instructs the read pointer controller not to update a read pointer array, which points to a current column being read from one of the per-port caches so that a repeating value in a stream of packets will be re-read from the one per-port cache;
    draining the UDF values from the per-port caches using the per-port stream engines to generate the test data packets and send streams of the test data packets to the one or more devices under test; and
    refilling the per-port caches with portions of the value lists from the DRAM at a rate sufficient to maintain the sending of the streams of packets to the device or devices under test, wherein refilling the per-port caches includes generating a refill request to obtain new UDF data from the DRAM when a predetermined number of UDF values are removed from a given cache, wherein the network test device includes a plurality of transmit ports for transmitting the test data packets to the one or more devices under test, wherein the network test device includes a per-port value list interface for each of the transmit ports, each per-port value list interface including the per-port value list cache for its respective transmit port, the per-port value list interfaces being separate from a central processing unit of the network test device and wherein the per-port value list interface for each transmit port issues its own refill requests to the DRAM to refill its respective value list cache, wherein re-filling the per-port caches includes:

maintaining a plurality of refill request first-in-first outs (FIFOs), wherein the refill request FIFOs correspond to priority levels, which correspond to per-port caches with different predetermined numbers of remaining UDF value entries;

writing cache refill requests to the refill request FIFOs based on numbers of remaining UDF values in the caches;

moving the cache refill requests from a first of the refill request FIFOs corresponding to a first priority level, which corresponds to per-port caches with a first number of remaining UDF value entries to a second of the refill request FIFOs corresponding to per-port caches with a second priority level, which corresponds to a second number of remaining UDF value entries, the second number being less than the first number; and processing the cache refill requests from the refill request FIFOs in order from a highest priority level refill request FIFO to a lowest priority level request FIFO.

2. The method of claim 1 wherein the value lists each include values to be inserted in packet headers or instrumentation headers.

3. The method of claim 1 wherein reading portions of each of the value lists into per-port caches includes time sharing access to the DRAM among the caches for each port such that a deterministic amount of memory bandwidth is allocated to each transmit port.

4. The method of claim 1 wherein draining the UDF values from the per-port caches includes popping the UDF values from the caches as the values are used to generate the packets.

5. The method of claim 1 comprising using the peek attribute to identify repeating UDF values in one of the per-port caches to be inserted in successive packets for a stream and wherein draining the UDF values includes using the peek attribute to maintain a repeating UDF value in the cache until a last packet having the repeating UDF value is generated and then popping the UDF value from the cache.

6. The method of claim 1 wherein refilling the per-port caches includes refilling the per-port caches as the caches become partially but not entirely empty.

7. The method of claim 6 wherein refilling the per-port caches includes prioritizing the refilling of the per-port caches according to the number of UDFs remaining in each cache.

8. The method of claim 1 wherein sending the streams of packets to one or more devices under test includes sending Ethernet frames to a storage, communications, or data network element under test.

9. The method of claim 8 wherein sending the Ethernet packets to one or more communications network element under test includes sending the Ethernet frames at line rate.

10. A system for generating simulated data packets for testing a communications or storage network element, the system comprising:

a network test device configured to generate and send test data packets to one or more devices under test, the network test device including:

at least one dynamic random access memory (DRAM) configured to store value lists, each value list including values for user defined fields to be inserted in the test data packets;

a packet generator configured to:

read each of the value lists from the DRAM into per-transmit port caches separate from the DRAM;

provide a read pointer controller that receives UDF requests from per-port stream engines, each request including a peek attribute that if asserted instructs the read pointer controller not to update a read pointer array, which points to a current column being read from one of the per-port caches so that a repeating value in a stream of packets will be re-read from the one per-port cache;

drain the UDF values from the per-port caches using the per-port stream engines to generate the test data packets and send streams of the test data packets to the one or more devices under test; and refill the per-port caches with portions of the value lists from the DRAM at a rate sufficient to maintain the sending of the streams of packets to the device or devices under test, wherein refilling the per-port caches includes generating a refill request to obtain new UDF data from the DRAM when a predetermined number of UDF values are removed from a given cache, wherein the network test device includes a plurality of transmit ports for transmitting the test data packets to the one or more devices under test, wherein the network test device includes a per-port value list interface for each of the transmit ports, each per-port value list interface including the per-port value list cache for its respective transmit port, the per-port value list interfaces being separate from a central processing unit of the network test device and wherein the per-port value list interface for each transmit port issues its own refill requests to the DRAM to refill its respective value list cache, wherein re-filling the per-port caches includes:

maintaining a plurality of refill request first-in-first outs (FIFOs), wherein the refill request FIFOs correspond to priority levels, which correspond to per-port caches with different predetermined numbers of remaining UDF value entries;

writing cache refill requests to the refill request FIFOs based on numbers of remaining UDF values in the caches;

moving the cache refill requests from a first of the refill request FIFOs corresponding to a first priority level, which corresponds to per-port caches with a first number of remaining UDF value entries to a second of the refill request FIFOs corresponding to per-port caches with a second priority level, which corresponds to a second number of remaining UDF value entries, the second number being less than the first number; and processing the cache refill requests from the refill request FIFOs in order from a highest priority level refill request FIFO to a lowest priority level request FIFO.

11. The system of claim 10 wherein the value lists each include values to be inserted in packet headers or instrumentation headers.

12. The system of claim 10 wherein the packet generator is configured to read portions of each of the value lists into per-port caches by time sharing access to the DRAM among the caches for each port such that a deterministic amount of memory bandwidth is allocated to each transmit port.

13. The system of claim 10 wherein the packet generator is configured to drain the UDF values from the per-port caches by popping the UDF values from the head of each cache as the values are used to generate the packets.

14. The system of claim 10 wherein the read pointer controller is configured to identify, using the peek attribute, repeating UDF values in one of the per-port caches to be inserted in successive packets for a stream and to drain the UDF values by maintaining, using the peek attribute, repeating UDF value in the cache until a last packet having the repeating UDF value is generated and then popping the UDF value from the cache.

15. The system of claim 10 wherein the packet generator is configured to refill the per-port caches as the caches become partially but not entirely empty.

16. The system of claim 15 wherein the packet generator is configured to prioritize the refilling of the per-port caches according to the number of UDFs remaining in each cache.

17. The system of claim 10 wherein the packet generator is configured to send Ethernet frames to a storage, communications, or data network element under test.

18. The system of claim 17 wherein the packet generator is configured to send the Ethernet frames at line rate.

19. A non-transitory computer readable medium having stored thereon executable instructions that when executed by the processor of a computer control the computer to perform steps comprising:

in a network test device configured to generate and send test data packets to one or more devices under test:
storing the plurality of value lists in dynamic random access memory (DRAM), each value list including values for user defined fields (UDFs) to be inserted in the test data packets;
reading each of the value lists from the DRAM into per-transmit port caches separate from the DRAM;
providing a read pointer controller that receives UDF requests from per-port stream engines, each request including a peek attribute that if asserted instructs the read pointer controller not to update a read pointer array, which points to a current column being read from one of the per-port caches so that a repeating value in a stream of packets will be re-read from the one per-port cache;
draining the UDF values from the per-port caches using the per-port stream engines to generate the test data packets and send streams of the test data packets to the one or more devices under test; and
refilling the per-port caches with portions of the value lists from the DRAM at a rate sufficient to maintain the sending of the streams of packets to the device or devices under test, wherein refilling the per-port caches includes generating a refill request to obtain new UDF data from the DRAM when a predetermined number of UDF values are removed from a given cache, wherein the network test device includes a plurality of transmit ports for transmitting the test data packets to the one or more devices under test, wherein the network test device includes a per-port value list interface for each of the transmit ports, each per-port value list interface including the per-port value list cache for its respective transmit port, the per-port value list interfaces being separate from a central processing unit of the network test device and wherein the per-port value list interface for each transmit port issues its own refill requests to the DRAM to refill its respective value list cache, wherein re-filling the per-port caches includes:
maintaining a plurality of refill request first-in-first outs (FIFOs), wherein the refill request FIFOs correspond to priority levels, which correspond to per-port caches with different predetermined numbers of remaining UDF value entries;
writing cache refill requests to the refill request FIFOs based on numbers of remaining UDF values in the caches;
moving the cache refill requests from a first of the refill request FIFOs corresponding to a first priority level, which corresponds to per-port caches with a first number of remaining UDF value entries to a second of the refill request FIFOs corresponding to per-port caches with a second priority level, which corresponds to a second number of remaining UDF value entries, the second number being less than the first number; and
processing the cache refill requests from the refill request FIFOs in order from a highest priority level refill request FIFO to a lowest priority level request FIFO.

* * * * *